(12) United States Patent
Hashimoto

(10) Patent No.: US 8,270,679 B2
(45) Date of Patent: *Sep. 18, 2012

(54) BIOMETRICS AUTHENTICATION SYSTEM

(75) Inventor: Gakuji Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 1189 days.

This patent is subject to a terminal disclaimer.

(21) Appl. No.: 12/078,495

(22) Filed: Apr. 1, 2008

(65) Prior Publication Data

US 2008/0253620 A1   Oct. 16, 2008

(30) Foreign Application Priority Data

Apr. 11, 2007  (JP) ................................ 2007-103843

(51) Int. Cl.
*G06K 9/00* (2006.01)
(52) U.S. Cl. ........................................................ 382/115
(58) Field of Classification Search ................... 382/115
See application file for complete search history.

(56) References Cited

U.S. PATENT DOCUMENTS

| | | | | |
|---|---|---|---|---|
| 6,195,448 | B1 * | 2/2001 | Schiller | 382/126 |
| 6,314,197 | B1 * | 11/2001 | Jain et al. | 382/125 |
| 6,401,551 | B1 * | 6/2002 | Kawahara et al. | 73/862.337 |
| 6,864,931 | B1 * | 3/2005 | Kumar et al. | 349/88 |
| 2003/0122956 | A1 * | 7/2003 | Sugimoto et al. | 348/362 |
| 2004/0120556 | A1 * | 6/2004 | Kono et al. | 382/124 |
| 2006/0098872 | A1 * | 5/2006 | Seo et al. | 382/181 |
| 2008/0075330 | A1 * | 3/2008 | Matsumura et al. | 382/115 |

FOREIGN PATENT DOCUMENTS

| | | |
|---|---|---|
| JP | 2001-273497 | 10/2001 |
| JP | 2003-084259 | 3/2003 |
| JP | 2003-263640 | 9/2003 |
| JP | 2003-283932 A | 10/2003 |
| JP | 3630675 B2 | 12/2004 |
| JP | 2006-068328 A | 3/2006 |
| JP | 2006-288872 | 10/2006 |

OTHER PUBLICATIONS

Japanese Office Action issued Apr. 28, 2009 for corresponding Japanese Application No. 2007-103843.

* cited by examiner

*Primary Examiner* — Claire X Wang
*Assistant Examiner* — Michael Vanchy, Jr.
(74) *Attorney, Agent, or Firm* — Rader Fishman & Grauer, PLLC

(57) ABSTRACT

A biometrics authentication system includes: a light source applying light to a living organism; a microlens array section condensing light from the living organism, and including a plurality of microlenses each having a different refractive power; an image pickup device obtaining image pickup data of the living organism on the basis of the light condensed by the microlens array section; a rotation angle determining section determining the rotation angle of the living organism on the basis of the image pickup data of the living organism; a three-dimensional information producing section producing three-dimensional information of the living organism on the basis of the image pickup data of the living organism; and an authentication section performing authentication on the basis of the rotation angle determined by the rotation angle determining section and the three-dimensional information produced in the three-dimensional information producing section.

12 Claims, 11 Drawing Sheets

BIOMETRICS AUTHENTICATION SYSTEM

CROSS REFERENCES TO RELATED APPLICATIONS

The present invention contains subject matter related to Japanese Patent Application JP 2007-103843 filed in the Japanese Patent Office on Apr. 11, 2007, the entire contents of which being incorporated herein by reference.

BACKGROUND OF THE INVENTION

1. Field of the Invention

The present invention relates to a biometrics authentication system performing authentication of a living organism through the use of three-dimensional information.

2. Description of the Related Art

In recent years, the introduction of personal identification techniques (biometrics) using biometrics authentication into access control in a specific area or bank ATMs has begun. Therefore, an increase in crimes by fake ID cards or identity thefts has become a social issue, so the establishment of a method of personal identification capable of preventing forgery is desired.

As such a method of identifying a living organism, methods using faces, fingerprints, voiceprints, irises, veins and the like as authentication data have been proposed. For example, in a system using faces as authentication data, it is difficult to precisely capture characteristics of individuals due to physical conditions or makeup, and the characteristics of faces are easily changed due to growth or the like, so it is difficult to use the same data throughout a lifetime. Therefore, in authentication using faces, it is considered difficult to achieve high precision in general. Moreover, fingerprints, voiceprints, irises and the like are personal information which is relatively less changed; however, forgery such as duplication of a fingerprint through the use of a resin, recording and reproducing of a voiceprint through the use of a recorder, duplication of an iris pattern through the use of a high-definition printer has been perceived as an issue.

On the other hand, the shape pattern of veins under the skin of a finger or a palm hardly changes from approximately two or three years of age, so the shape pattern of the veins can be used as stable authentication data throughout a lifetime. Moreover, it is difficult to visually check veins directly from the skin surface, so various proposals have been made (for example, refer to Japanese Unexamined Patent Application Publication No. 2006-68328).

Now, in FIG. 11A, an example of a biometrics authentication system in a related art using the above-described vein authentication system is shown. In a technique in the related art, when a living organism 2 as an object subjected to authentication is held over a specified position, the vein pattern authentication can be performed. More specifically, when the living organism 2 is irradiated with near-infrared light by a light source 100 such as an LED (Light Emitting Diode) arranged on the lateral side (or the longitudinal side) of the living organism 2, optical absorption of blood hemoglobin flowing through veins can be observed. One refractive converging lens 101 forms an image of veins by such optical absorption on an image pickup device 102 such as a CCD (Charge Coupled Device) or a CMOS (Complementary Metal Oxide Semiconductor), and authentication data including a vein shape shown in FIG. 11B can be obtained.

Information used for authentication of a living organism is desired to have high reproducibility. Therefore, a technique of arranging a guide fixing a living organism (a finger) during authentication has been disclosed (for example, Japanese Patent No. 3630675). An authentication system according to Japanese Patent No. 3630675 has a configuration that when a finger is placed along a guide, a switch is pressed by an end of the finger, and when the switch is pressed, authentication starts. In such a configuration, the degree of freedom of a fingertip is limited in a lateral direction (referred to as an x direction), a longitudinal direction (referred to as a y direction) of the finger, and a direction orthogonal to these directions (referred to as a z direction), and the reproducibility can be improved.

SUMMARY OF THE INVENTION

In the above-described biometrics authentication systems according to Japanese Unexamined Patent Application Publication No. 2006-68328 and Japanese Patent No. 3630675, one plane of a living organism is used as an object subjected to authentication, so two-dimensional information is used as authentication data. Therefore, for example, in the case where a finger is placed on glass or the like to perform authentication, authentication data of a plane in contact with the glass can be obtained; however, data of a part not in contact with the glass is not obtained, so there is a difference in obtained data depending on the position of the finger. In such a case, image pickup data is corrected by image processing or the like to perform authentication, so the precision of authentication is lowered. Moreover, in the case of two-dimensional information, when authentication data is exploited in some way, there is a possibility that two-dimensional information can be duplicated, so two-dimensional information is not preferable in terms of safety. Therefore, it is desirable to perform authentication using three-dimensional information including not only planar information of the living organism but also information in a depth direction of the living organism. When such three-dimensional information is used, the amount of information used in authentication is larger than that of two-dimensional information, so authentication precision or safety is improved.

However, when the amount of information used in authentication is increased, as described above, authentication precision or safety is improved, but the degree of freedom of the living organism is increased during shooting. In authentication using two-dimensional information, as long as the degrees of freedom in three directions, that is, the x direction, the y direction and the z direction of the finger are controlled, there is not a large difference in obtained data, so constant reproducibility is maintained. On the other hand, in authentication using three-dimensional information, information in the depth direction of the living organism is included, so the degree of freedom of the living organism is larger than that of two-dimensional information, so reproducibility is reduced. Therefore, in authentication using three-dimensional information, a decline in authentication precision is an issue.

In view of the foregoing, it is desirable to provide a biometrics authentication system capable of securing high authentication precision in authentication using three-dimensional information.

According to an embodiment of the invention, there is provided a biometrics authentication system including: a light source applying light to a living organism; a microlens array section condensing light from the living organism, and including a plurality of microlenses each having a different refractive power; an image pickup device obtaining image pickup data of the living organism on the basis of the light condensed by the microlens array section; a rotation angle determining section determining the rotation angle of the living organism on the basis of the image pickup data of the living organism; a three-dimensional information producing section producing three-dimensional information of the living organism on the basis of the image pickup data of the living organism; and an authentication section performing authentication on the basis of the rotation angle determined by the rotation angle determining section and the three-dimensional information produced in the three-dimensional information producing section.

In the biometrics authentication system according to the embodiment of the invention, when light is applied to a living organism from the light source, the light is condensed in the microlens array section, and image pickup data is obtained on the basis of the condensed light. On the basis of the image pickup data, the rotation angle of the living organism is determined in the rotation angle determining section, and in the three-dimensional information producing section, three-dimensional information of the living organism is constructed. On the basis of the information of the rotation angle, an authentication pattern of the living organism which is registered in advance is obtained, and authentication is performed by comparing the authentication pattern with the three-dimensional information. As the amount of information in authentication using three-dimensional information, is larger than that in authentication using two-dimensional information in a related art, the degree of freedom of the living organism is increased, and depending on the image pickup conditions such as the placement of the living organism, authentication may not be performed correctly. Therefore, when authentication is performed on the basis of the rotation angle and the three-dimensional information of the living organism, for example, even if the positioning of the living organism during authentication is different from that during registering the pattern, correct authentication is performed.

In the biometrics authentication system according to the embodiment of the invention, the rotation angle of the living organism is determined on the basis of the image pickup data, and the three-dimensional information of the living organism is constructed on the basis of the image pickup data, and authentication is performed on the basis of the rotation angle and the three-dimensional information of the living organism, so irrespective of the image pickup conditions such as the placement of the living organism, correct authentication can be performed. Therefore, in authentication using three-dimensional information, high authentication precision can be secured.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
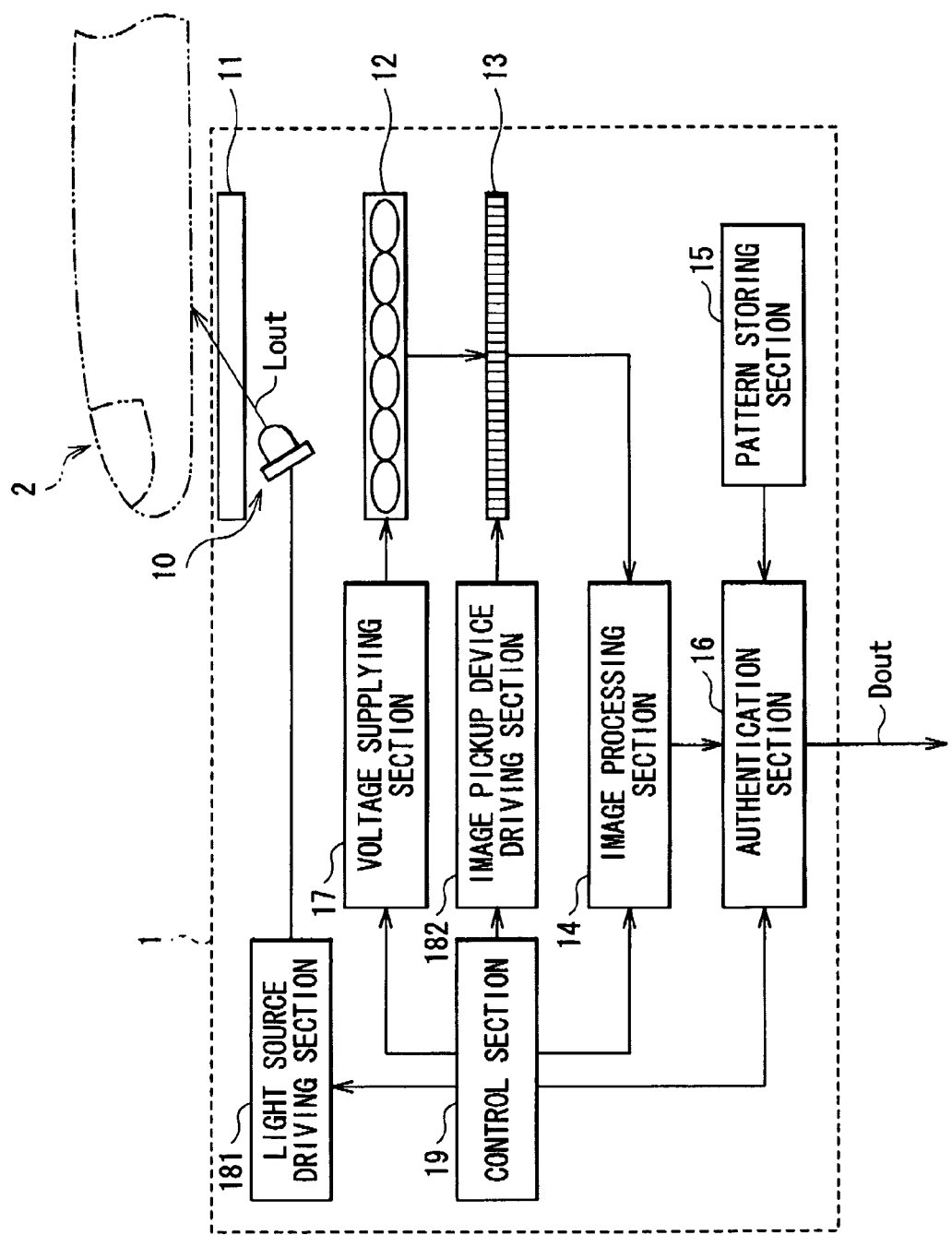
FIG. 1 is a block diagram showing the whole configuration of a biometrics authentication system according to an embodiment of the invention.
Figure 2:
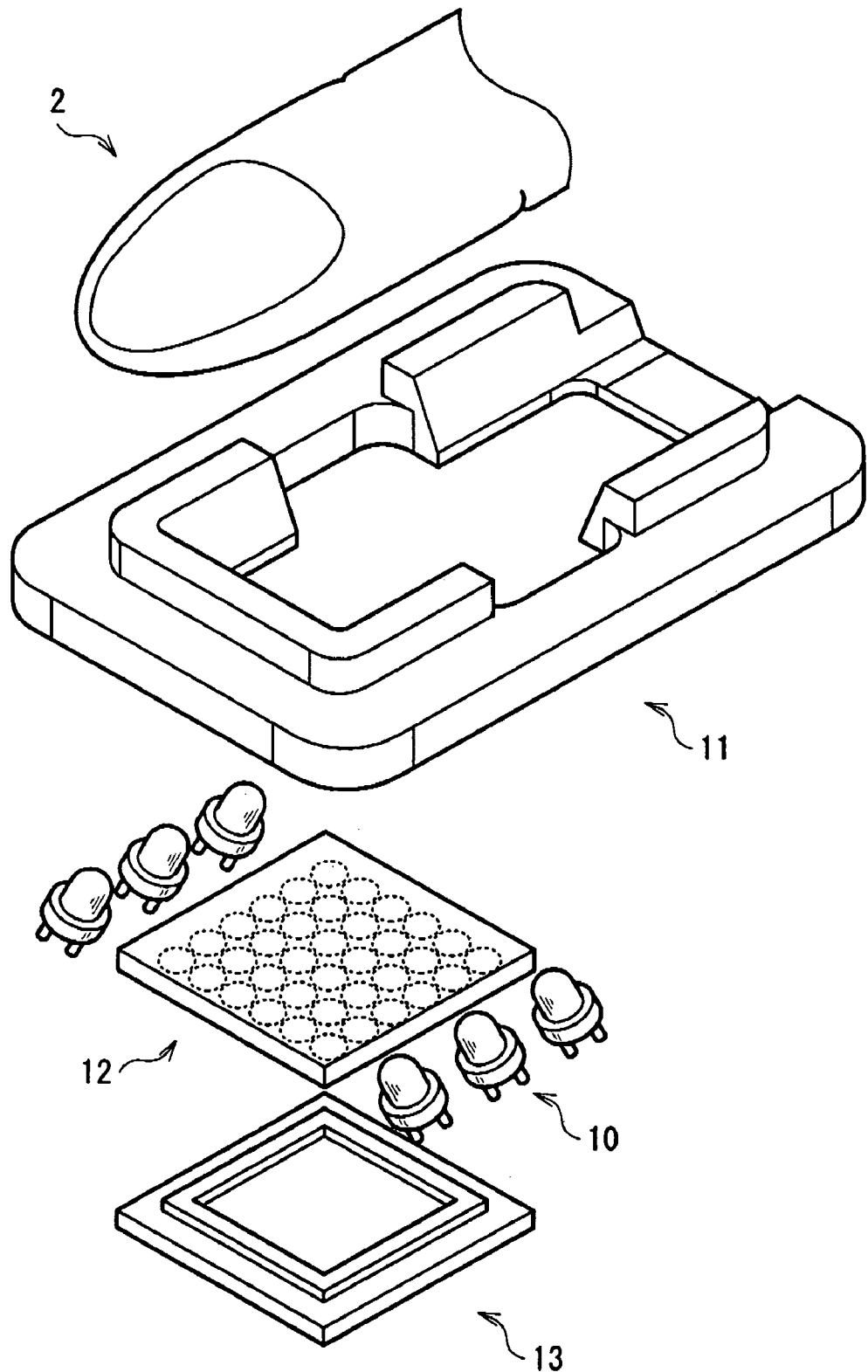
FIG. 2 is a perspective view of an outline configuration of the biometrics authentication system according to the embodiment of the invention.

FIG. 1 shows the whole configuration of a biometrics authentication system 1 according to a first embodiment of the invention. FIG. 2 shows a perspective view showing an outline configuration of the biometrics authentication system 1. The biometrics authentication system 1 picks up an image of a living organism (for example, a fingertip) 2 as an object subjected to image pickup to perform biometrics authentication, and outputs authentication result data Dout, and the biometrics authentication system 1 includes a light source 10, a fixing cup 11, a microlens array 12, an image pickup device 13, an image processing section 14, a pattern storing section 15, an authentication section 16, a voltage supplying section 17, a light source driving section 181, an image pickup device driving section 182 and a control section 19. In particular, the image processing section 14 includes a rotation angle determining section determining the rotation angle of the living organism 2, and a three-dimensional information producing section producing three-dimensional information of a vein pattern of the living organism 2. Hereinafter, the lateral direction and the longitudinal direction of the living organism 2 are referred to as an x direction and a y direction, respectively, and a direction orthogonal to the x direction and the y direction is referred to as a z direction. The "rotation angle" of the living organism 2 includes rotation angles in x, y and z directions of the living organism 2. However, during picking up an image, specifically a rotation in the y direction easily occurs, so it is preferable to determine the rotation angle in the y direction.

The light source 10 applies light to the living organism 2 as an object subjected to image pickup, and is formed of, for example, an LED or the like. The light source 10 can be switched to emit light of a wavelength region (approximately from 700 nm to 1200 nm) passing through the living organism 2, for example, near-infrared light and light of a wavelength (from 360 nm to 700 nm) reflected by a surface of the living organism 2, for example, white light. For example, when image pickup data of a vein pattern of the living organism 2 is obtained, the near-infrared light is applied, and, for example, when image pickup data of a surface of the living organism 2 is obtained, the white light is applied. In the case where the near-infrared light is used to obtain the vein pattern, by the balance between the transmittance through the living organism 2 and the absorption into reduced hemoglobin (a vein) in the living organism 2, light use efficiency can be improved.

The fixing cup 11 fixes and holds the living organism 2 during authentication, and the bottom surface of the fixing cup 11 has an opening. The configuration of the fixing cup 11 will be described later.

The microlens array 12 includes a plurality of microlenses arranged in a matrix form, and functions as an image pickup lens of the living organism 2. The microlens array 12 is arranged below the fixing cup 11 (more specifically between the fixing cup 11 and the image pickup device 13). The plurality of microlenses are formed of liquid lenses, liquid crystal lenses or the like, and are variable focusing lenses varying a focal position when an arbitrary voltage is applied.

Figure 3:
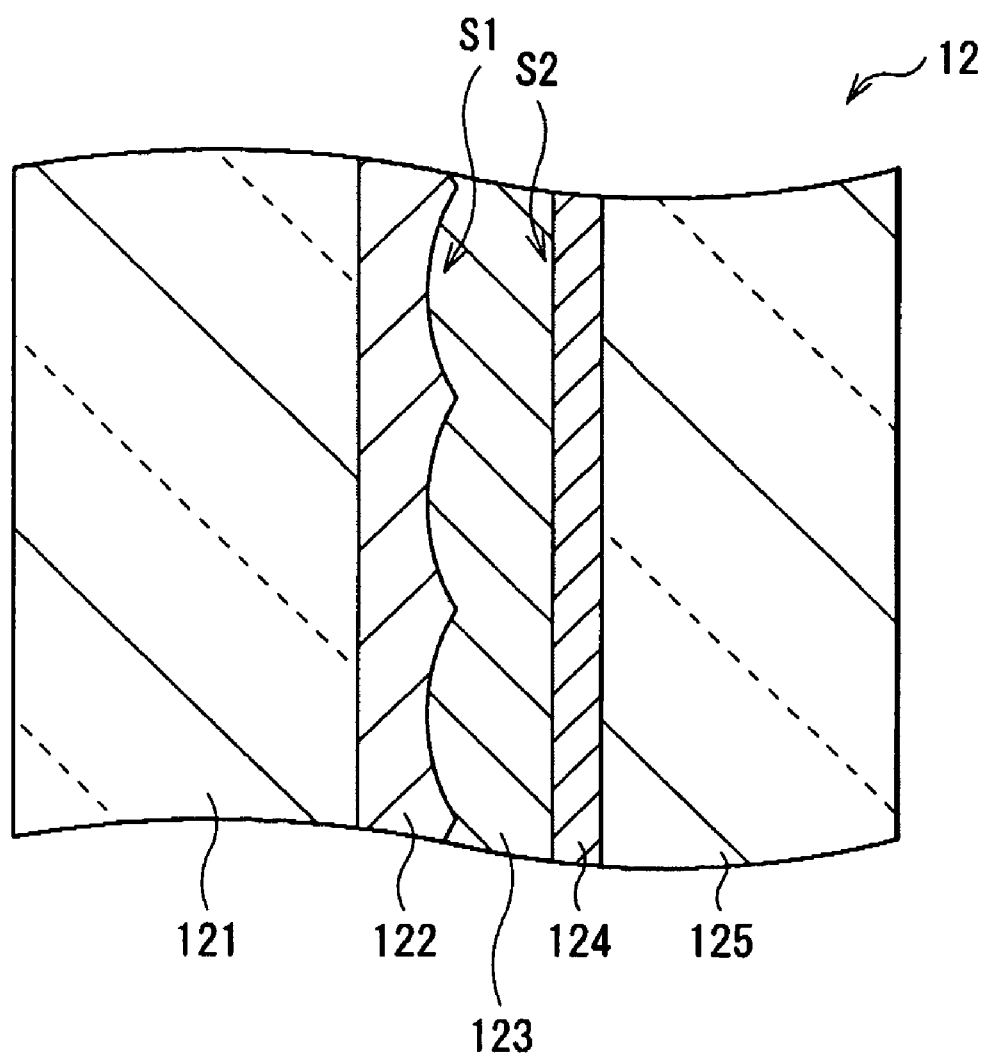
FIG. 3 is an enlarged sectional view of a microlens array shown in FIG. 1.

FIG. 3 shows an enlarged sectional view of the microlens array 12. In the microlens array 12, a liquid crystal layer 123 is formed between a pair of facing substrates 121 and 125, and electrodes 122 and 124 are formed between the liquid crystal layer 123 and the substrate 121 and between the liquid crystal layer 123 and the substrate 125, respectively.

The substrates 121 and 125 each are formed of, for example, a transparent substrate such as a glass substrate, and an incident light ray can pass through the substrates 121 and 125. A voltage is supplied to the electrodes 122 and 124 from the voltage supplying section 17. The electrodes 122 and 124 each are formed of a transparent electrode, for example, ITO (Indium Tin Oxide), and as in the case of the substrates 121 and 125, the incident light ray can pass through the electrodes 122 and 124. On a surface S1 of the electrode 122 of surfaces S1 and S2 of the electrodes 122 and 124, a plurality of concave curved surfaces are formed in a matrix form, thereby a plurality of liquid crystal microlenses are formed. The liquid crystal layer 123 is formed of, for example, a liquid crystal material such as nematic liquid crystal, and the refractive index of the liquid crystal layer 123 is changed according to a voltage applied between the electrodes 122 and 124.

The image pickup device 13 receives light from the microlens array 12 to obtain image pickup data, and is arranged on a focal plane of the microlens array 12 during authentication. The image pickup device 13 includes a plurality of CCDs or the like arranged in a matrix form.

The image processing section 14 performs predetermined image processing on the image pickup data obtained in the image pickup device 13 in response to the control of the control section 19 to output the image pickup data to the authentication section 16. In addition, the image processing section 14, and the authentication section 16 and the control section 19 which will be described later each include, for example, a microcomputer or the like. The configuration of the image processing section 14 will be described later.

The pattern storing section 15 is a section storing a biometrics authentication pattern (which is a comparison pattern relative to an image pickup pattern obtained at the time of authentication, and which is obtained by picking up an image of a living organism in advance), and includes a nonvolatile memory device (for example, an EEPROM (Electrically Erasable Programmable Read Only Memory) or the like). The authentication section 16 is a section performing authentication of the living organism 2 as an object subjected to image pickup by comparing an image pickup pattern outputted from the image processing section 14 to the biometrics authentication pattern stored in the pattern storing section 15 in response to the control of the control section 19.

The voltage supplying section 17 supplies a voltage to the microlenses in the microlens array 12, and the focal length of the microlens array 12 is changed on the basis of the magnitude of the supplied voltage.

The light source driving section 181 drives the light source 10 to emit light in response to the control of the control section 19. The image pickup device driving section 182 drives the image pickup device 13 to pick up an image (to receive light) in response to the control of the control section 19. The control section 19 controls the operations of the image processing section 14, the authentication section 16, the voltage supplying section 17, the light source driving section 181 and the image pickup device driving section 182.

Next, referring to FIGS. 4, 5A, 5B and 5C, the configuration of the fixing cup 11 will be described below.

Figure 4:
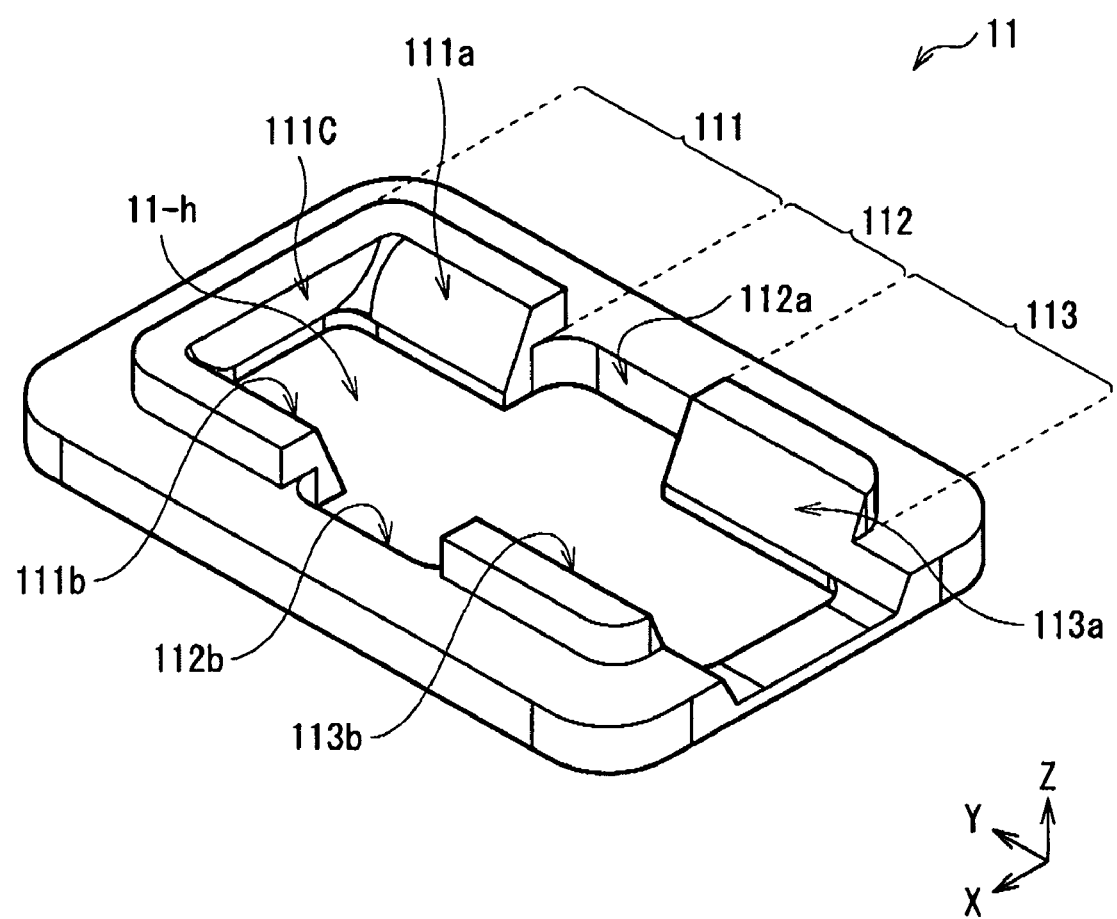
FIG. 4 is a perspective view of a fixing cup shown in FIG. 1.
Figures 5A, 5B:
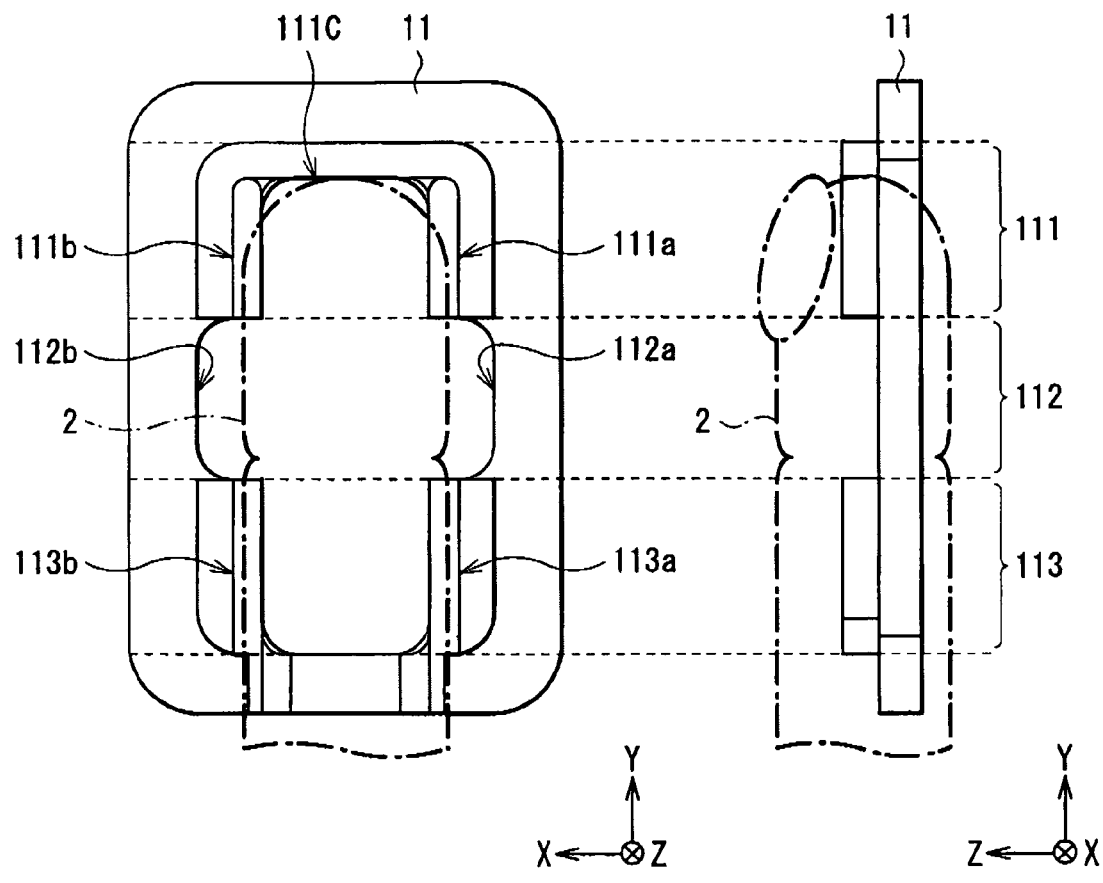
FIGS. 5A, 5B and 5C are an XY plane view, a side view viewed from an X direction, and a side view viewed from a Y direction of the fixing cup shown in FIG. 1, respectively.
Figure 5C:
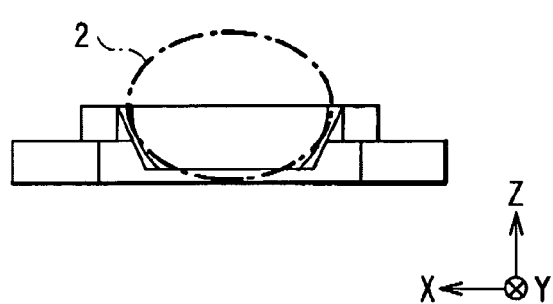

FIG. 4 is a perspective view showing an example of the configuration of the fixing cup 11. FIG. 5A is a plan view including the lateral direction (the x direction) and the longitudinal direction (the y direction) of the living organism (fingertip) 2, FIG. 5B is a side view viewed from the x direction, and FIG. 5C is a side view viewed from the y direction. In FIGS. 5A, 5B and 5C, the position where the living organism 2 is placed is shown by a dashed-dotted line.

The fixing cup 11 includes two fixing sections 111 and 113 on both ends in the y direction, and a region between the fixing sections 111 and 113 is an image pickup section 112. The fixing sections 111 and 113 are regions for fixing the living organism 2, and the image pickup section 112 is a region where an image of the living organism 2 is picked up. Moreover, the bottom surface of the fixing cup 11 has an opening 11-h. In other words, light is directly applied to the living organism 2 from the light source 10.

The fixing section 111 specifically fixes a tip part of the living organism 2, and has three inner walls 111a, 111b and 111c. Moreover, the inner walls 111a and 111b are arranged at a predetermined interval (an interval determined on the basis of the width in the x direction of the living organism 2) so as to face each other in the x direction, and the facing surfaces of the inner walls 111a and 111b are inclined. The three inner walls 111a, 111b and 111c form a U-shaped inner wall as a whole. The fixing section 113 has two inner walls 113a and 113b. The inner walls 113a and 113b are arranged so as to face each other as in the case of the inner walls 111a and 111b of the fixing section 111, and the facing surfaces of the inner walls 113a and 113b are inclined.

Thus, in the fixing section 111 and the fixing section 113, five inner walls are arranged at predetermined intervals in the x direction and the y direction, so four degrees of freedom of rotations, that is, rotations in the x direction, y direction and an x axis (direction) of the living organism 2 and a rotation in a z axis (direction) are controlled. Moreover, the facing surfaces of the inner walls 111a and 111b and the facing surfaces of the inner walls 113a and 113b are inclined, so the degree of freedom in the z direction is controlled. Therefore, by the above-described configuration, five degrees of freedom in total are reliably controlled. Therefore, in authentication using three-dimensional information, the reproducibility of a shape pattern can be improved, and it is advantageous to achieve high authentication precision.

On the other hand, in the image pickup section 112, the width in the x direction of the opening 11-h is larger than those of the fixing sections 111 and 113. In other words, an interval in the x direction between the inner walls 112a and 112b of the image pickup section 112 is larger than an interval between the inner walls 111a and 111b and an interval between the inner walls 113a and 113b. Thereby, the image pickup section 112 which actually picks up an image of the living organism 2 has an opening with a larger width than the width in the x direction of the living organism 2. In a related art (for example, referred to as Japanese Patent No. 3630675), the bottom surface of a fixing cup is made of a transparent member such as glass, and the living organism 2 is placed on the transparent member to perform authentication. In this case, the shape of veins or the like of the living organism 2 is pressed by pressure, so it is difficult to obtain an accurate shape pattern. In authentication using two-dimensional information, a two-dimensional image of the living organism is picked up, so it is not an issue; however, in authentication using three-dimensional information, authentication including information in the depth direction of the living organism is performed, so it is an important issue. Therefore, when the bottom surface of the image pickup section 112 has an opening with a larger width than the width of the living organism 2, the living organism 2 is not pressed, so the reproducibility of a shape pattern can be improved.

In FIGS. 4, 5A, 5B, 5C or the like, each inner wall of the fixing sections 111 and 113 is formed so as to be projected from a reference surface of the fixing cup 11; however, the shape of each inner wall is not specifically limited to this shape. Depending on the thickness of the whole fixing cup 11, each inner wall may be formed so as to be dented, or to be flat relative to the reference surface.

Next, the configuration of the image processing section 14 will be described below.

The image processing section 14 includes the rotation angle determining section determining the rotation angle of the living organism 2 on the basis of, for example, image pickup data such as the surface of the living organism 2 and the three-dimensional information producing section producing three-dimensional information on the basis of the image pickup data of the vein pattern of the living organism 2.

Figure 6A:
FIGS. 6A, 6B and 6C are illustrations for describing the shapes of cores of fingerprints.
Figure 6B:
Figure 6C:

In the rotation angle determining section, the rotation angle of the living organism 2 can be determined by two-dimensional information in the living organism 2, for example, the positional information of the core of the fingerprint of the living organism 2. Referring to FIGS. 6A, 6B, 6C and 7, a method of determining the rotation angle of the living organism 2 by the positional information of the core of the fingerprint will be described below. As shown in FIGS. 6A, 6B and 6C, the fingerprint can be roughly classified under three kinds of patterns, that is, loop (refer to FIG. 6A), arch (refer to FIG. 6B) and whorl (refer to FIG. 6C). Black lines indicate friction ridges of the fingerprint. FIG. 6A shows a fingerprint including horseshoe-shaped friction ridges around the center of a fingertip. FIG. 6B shows a fingerprint including friction ridges of an arch shape extending toward the right and the left in a finger cushion. FIG. 6C shows a fingerprint including whorl, circle, or oval-shaped friction ridges in a finger cushion.

The fingerprints shown in FIGS. 6A, 6B and 6C have cores C1, C2 and C3 in their center, respectively. The core of a fingerprint such as the cores C1, C2 and C3 exists in fingerprints of any pattern. The position of the core of the fingerprint is unchanged, so the rotation angle of the living organism 2 can be determined through the use of the positional information of the core.

Figure 7:
FIG. 7 is an illustration for describing a method of identifying the core of a fingerprint.

Such positional information of the core can be formed by extracting minutia points of the fingerprint as image pickup data of the surface of the living organism 2 by, for example, a known minutia method, and using information such as the number of minutia points and a relative positional relationship between the minutia points. More specifically, as shown in FIG. 7, the minutia points of the fingerprint include the beginning point and the ending point (end points $P_E$) of a ridge friction of the fingerprint, a point where the ridge friction is bifurcated (a bifurcation point $P_S$) and the like. Alternatively, the positional information of the core of the fingerprint may be formed by obtaining the shape pattern of ridge frictions of the fingerprint and using the shape pattern.

Then, on the basis of the positional information of the core which is obtained in such a manner, the rotation angle of the living organism 2 is determined. For example, in the fixing cup 11, a reference point is appointed in advance, and the rotation angle can be determined by using a vector connecting the reference point and the position of the core of the fingerprint of the living organism 2. At this time, a vector connecting the reference point of the fixing cup 11 and the position of the core of the fingerprint in an authentication pattern stored in the pattern storing section 15 is a reference vector, and the rotation angle is determined by comparing between the reference vector and the vector showing the position of the core of the fingerprint of the living organism 2 of which an image is actually picked up.

On the other hand, in the three-dimensional information producing section, three-dimensional information of the vein pattern of the living organism 2 is produced. The three-dimensional information is shape information of the vein pattern including information in the depth direction of the living organism 2 and, for example, shape information constructed on the basis of the image pickup data obtained from a plurality of layers inside the living organism 2. More specifically, after the obtained image pickup data on the plurality of layers are reconstructed into a high-resolution two-dimensional image by, for example, a system described in Japanese Unexamined Patent Application Publication No. 2003-283932 or the like, a plurality of two-dimensional images and the focal position information of the lenses are combined to be converted into three-dimensional information. Moreover, three-dimensional information of the vein pattern is formed by performing an edge process and a binarization process.

Figure 8:
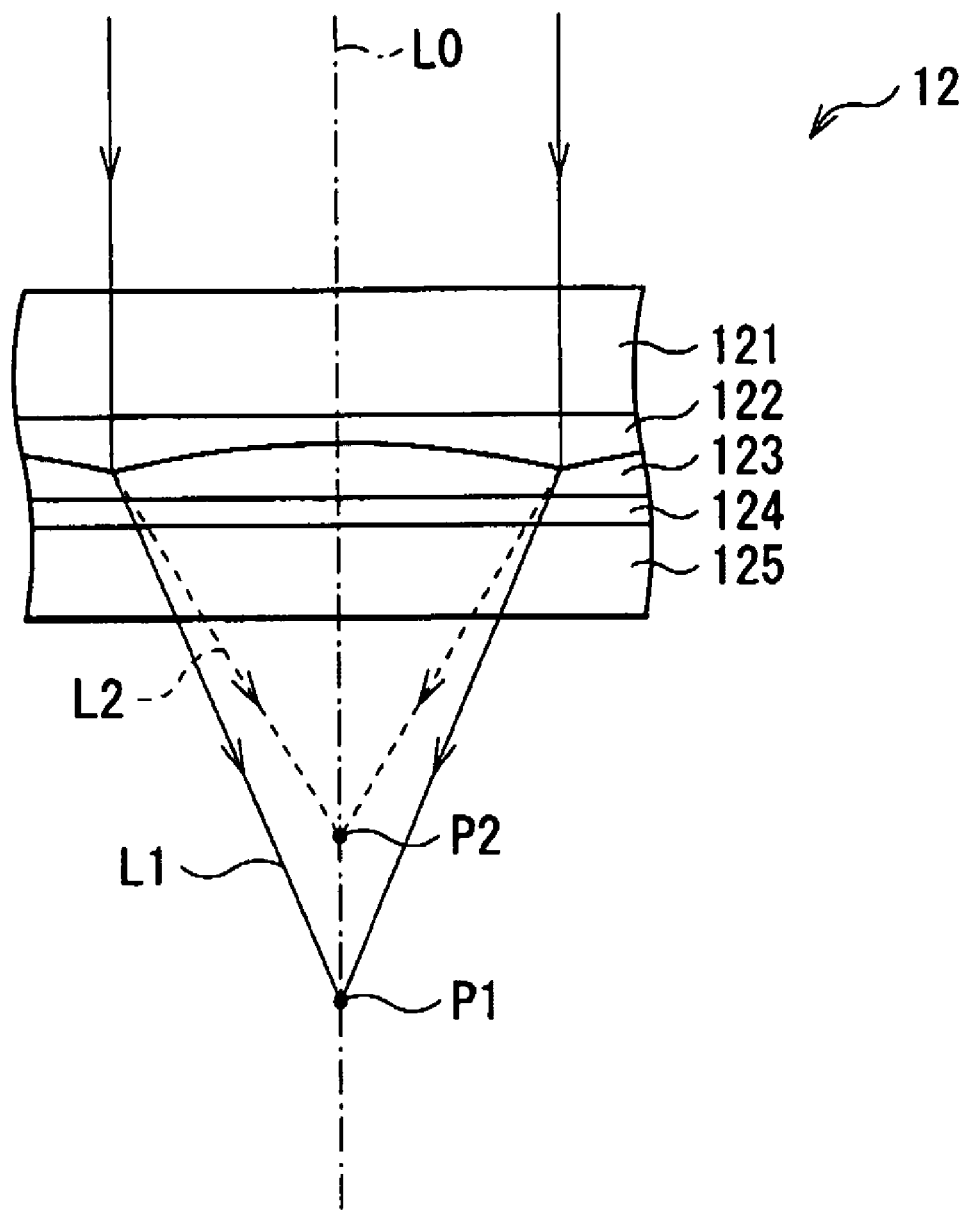
FIG. 8 is a sectional view for describing a function of the microlens array shown in FIG. 1.
Figure 9:
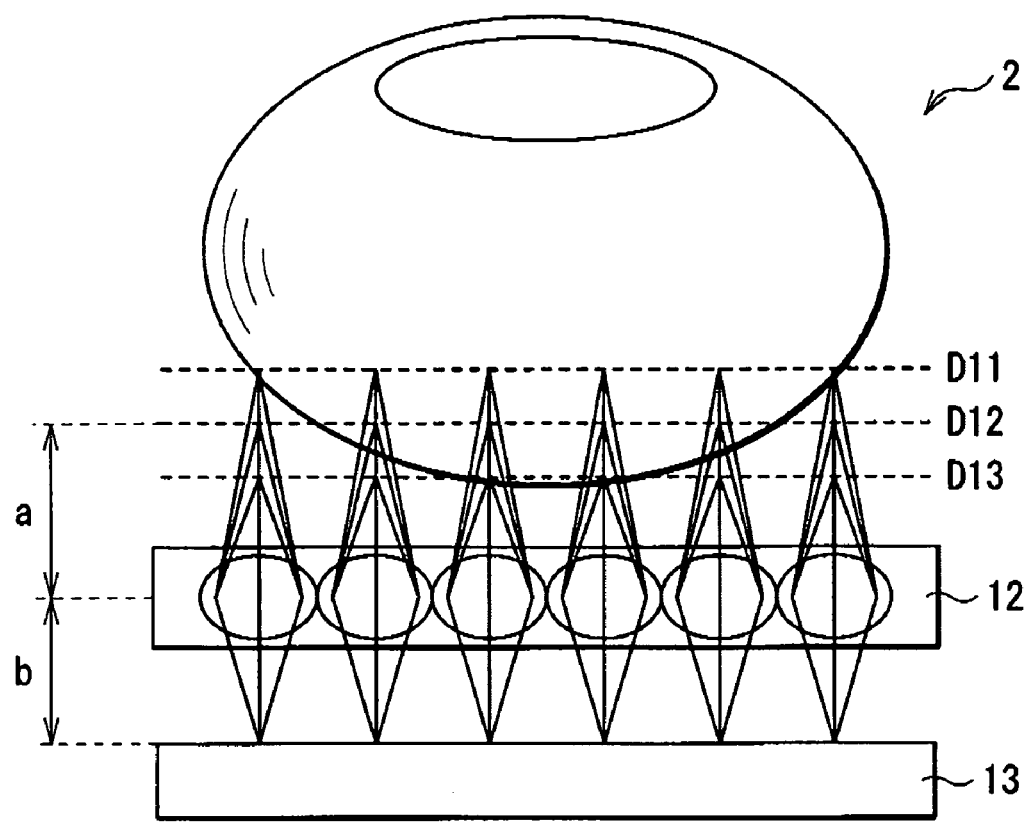
FIG. 9 is a schematic view for describing optical paths of the biometrics authentication system shown in FIG. 1.

Next, the operation (a biometrics authentication process) of the biometrics authentication system 1 will be described in detail below. FIG. 8 shows a sectional view for describing a function of the microlens array 12, and FIG. 9 shows a sectional view of essential parts of optical paths when obtaining a vein pattern of a finger.

In the biometrics authentication system 1, at first, when the living organism (for example, a fingertip) 2 is placed on the fixing cup 11, light Lout is emitted from the light source 10 by the driving operation of the light source driving section 181, and the light Lout is applied to the living organism 2 from the bottom surface of the fixing cup 11. Then, a voltage is supplied to the microlenses in the microlens array 12 (more specifically between the electrodes 122 and 124) from the voltage supplying section 17 in response to the control of the control section 19, and when an image of the living organism 2 is picked up in this state, the vein pattern of the living organism 2 is obtained. At this time, when the voltage supplied to the microlenses is low, the refractive index of the liquid crystal layer 123 is reduced accordingly, and as a result, for example, like a light ray L1 in FIG. 8, the incident light ray toward the microlenses is refracted in a refraction direction forming a relatively small refraction angle to be condensed at a relatively long focal length (for example, at a focal point position P1 on an optical axis L0 shown in FIG. 8). On the other hand, when the voltage supplied to the microlenses is high, the refractive index of the liquid crystal layer 123 is increased accordingly, and as a result, for example, like a light ray L2 in FIG. 8, the incident light ray toward the microlenses is refracted in a refraction direction forming a relatively large refraction angle to be condensed at a relatively short focal length (for example, at a focal point position P2 on an optical axis L0 shown in FIG. 8). Thus, a change in the supplied voltage can cause a change in the focal length of the microlens array 12.

At this time, when white light is emitted from the light source 10, and a voltage is supplied to the microlens array 12, image pickup data of the surface (fingerprint) of the living organism 2 can be obtained in the image pickup device 13. On the other hand, when near-infrared light is emitted from the light source 10, and a voltage is supplied a plurality of times so that the voltage is changed in stages, image pickup data of veins on a plurality of different layers inside the living organism 2 can be obtained. For example, as shown in FIG. 9, a supplied voltage to the microlenses is changed to V1, V2 and V3 (V1<V2<V3) (not shown) to obtain image pickup data in each state, thereby vein patterns on three layers D11, D12 and D13 inside the living organism 2 can be obtained.

A specific example in the case of actually obtaining three-dimensional information by the above-described technique will be described below. At first, assuming that a distance from the lens center of the microlens array 12 to an object is "a", a distance from the lens center to an image pickup plane is "b", and the focal length of a lens is "f", a relationship shown in Formula (1) is established. Moreover, assuming that the thickness of the living organism 2 as an object to be measured is approximately 10 mm, in the case where when the living organism 2 is placed on the fixing cup 11, three-dimensional information having a=4, b=4, and 4 mm (a=4±2 mm) in an optical axis depth direction (in the depth direction of the living organism 2) is attempted to be obtained, by Formula (1), the value of f is 1.3 to 2.4. Assuming that a lens diameter D is 0.2, by Formula (2), the value of NA becomes 0.04 to 0.08. The value is considered to be sufficiently feasible even in the case where the liquid lens or the liquid crystal lens is used. Moreover, in the case where it is difficult to achieve the value with a single lens, a combination with a refractive lens in a related art can be used, and, for example, a lens with NA of 0.06 is formed by using a refractive lens, and the NA change amount of ±0.02 may be achieved by a microlens.

$$1/a + 1/b = 1/f \quad (1)$$

$$NA = D/2f \quad (2)$$

Moreover, assuming that the diameter of a permissible circle of confusion on a film in a lens for photograph is φ, a focal depth H (on one side) of an optical system is estimated by Formula (3). In general, with an optical system of a 35-mm film, the diameter φ is considered to be approximately 40 μm, so the value of the focal depth H is 0.27 mm (f=1.3) to 0.48 mm (f=2.4). Therefore, in the case of attempting to obtain a three-dimensional image with 4 mm in a depth direction, when 5 to 8 images are obtained by changing the focal length f of the microlens, while satisfying the condition of the diameter φ of the permissible circle of confusion, sequential image information in the depth direction inside the living organism 2 can be obtained.

$$H = \phi \cdot f/D \quad (3)$$

In the embodiment, a plurality of image pickup data are obtained by sequentially changing the focal length, so there is an issue that time necessary for authentication is longer than that in the case where authentication is performed with two-dimensional information. However, in general, the liquid lens or the liquid crystal lens can achieve a very fast response frequency (a step response of several tens of milliseconds), compared to a mechanical drive system variable focusing lens such as a zoom lens. Therefore, time necessary to shoot the above-described number of images is estimated to be approximately within 1 second. Therefore, it is considered that sufficient authentication can be performed while the living organism 2 is held by the fixing cup 11, so the issue is practically insignificant.

Figure 10:
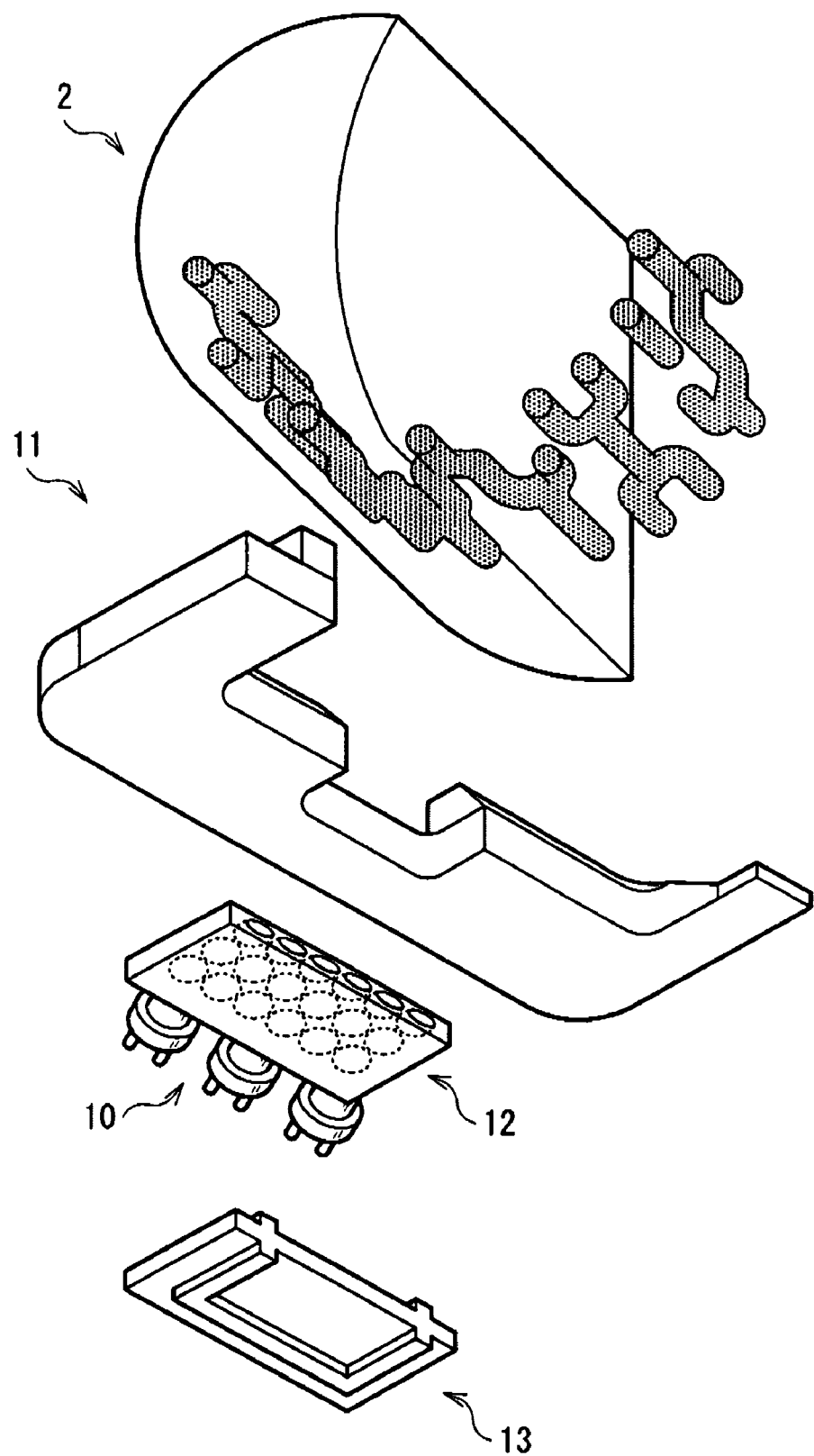
FIG. 10 is an illustration showing three-dimensional information obtained by the biometrics authentication system shown in FIG. 1.

The image pickup data of the surface of the surface of the living organism 2 and the image pickup data of veins on a plurality of layers both of which are obtained in the above-described manner are inputted into the image processing section 14. In the image processing section 14, the positional information of the core of the fingerprint is formed on the basis of the image pickup data of the surface of the living organism 2, and the rotation angle of the living organism 2 is determined on the basis of the positional information of the core of the fingerprint. On the other hand, three-dimensional information of the vein pattern shown in FIG. 10 is constructed on the basis of the image pickup data of veins on a plurality of layers. Then, information about the determined rotation angle of the living organism 2 and the constructed three-dimensional information of the vein pattern are outputted to the authentication section 16.

Next, in the authentication section 16, a shape pattern (a partial authentication pattern) viewed from an angle direction according to the above-described rotation angle is selectively extracted from authentication patterns for vein authentication stored in the pattern storing section 15. Next, the extracted shape pattern is compared to the three-dimensional information produced by the three-dimensional information producing section to determine whether they match each other, thereby the authentication of the living organism is performed. Then, a final biometrics authentication result (the authentication result data Dout) is outputted, thereby the biometrics authentication is completed.

As described above, in the biometrics authentication system 1 according to the embodiment, while the rotation angle of the living organism 2 is determined on the basis of the positional information of the core formed from the image pickup data of the surface of the living organism 2 in the image processing section 14, three-dimensional information of the vein pattern is produced from the image pickup data of the inside of the living organism 2. In this case, as the amount of the three-dimensional information is larger than that of two-dimensional information, duplication is difficult, so safety can be improved. Moreover, misjudgment of patterns of different living organisms as the same patterns is prevented, so it is considered that the authentication precision is improved. However, when the amount of information is too large, the degree of freedom is increased, so depending on conditions of image pickup such as the placement of the living organism 2, authentication may not be able to be correctly performed. It is because in authentication using three-dimensional information, in addition to the degrees of freedom in three directions, that is, the x direction, the y direction and the z direction of the living organism 2, the degree of freedom of a rotation in each direction is generated. In the embodiment, while the rotation angle of the living organism 2 is determined, the three-dimensional information of the vein pattern is formed, and authentication is performed on the basis of the information, so irrespective of the conditions of image pickup such as the positioning or placement of the living organism 2, authentication can be performed correctly. Therefore, in authentication using three-dimensional information, high authentication precision can be secured.

Moreover, in the case where the above-described fixing cup 11 is used, five degrees of freedom in total, that is, the degrees of freedom in the x direction, the y direction and the z direction and the degrees of freedom of rotations in the x direction and the z direction can be controlled, so it is advantageous to secure authentication precision.

Figure 11A:
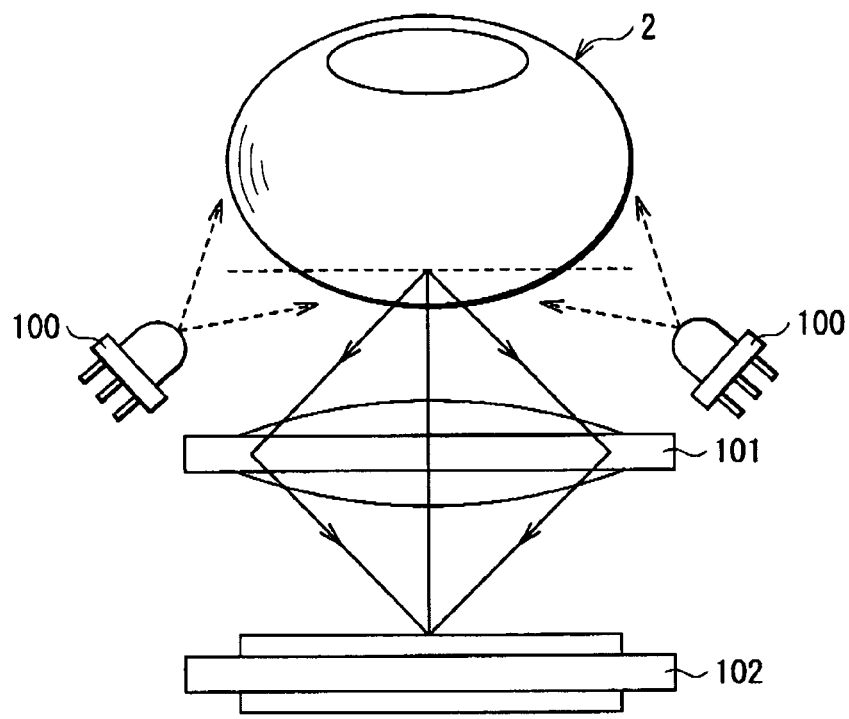
FIGS. 11A and 11B are illustrations showing an outline configuration of a biometrics authentication system in a related art.
Figure 11B:
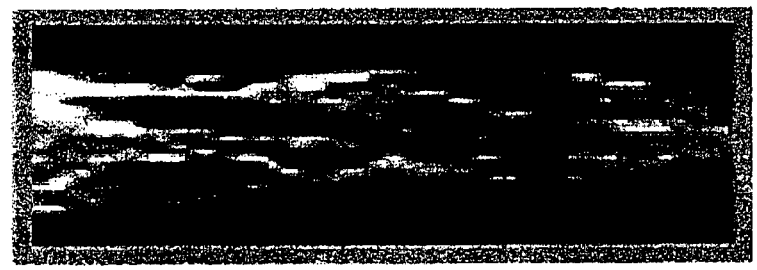

Further, when a compound eye optical system such as the microlens array 12 including a plurality of microlenses is used, the precision of the image pickup data can be improved. In general, to improve resolution in a configuration shown in FIG. 11A, it is necessary to increase the numbers of pixels (the sizes of pixels in the case where the pixel pitch is the same) of the converging lens 101 and the image pickup device 102. Therefore, as the converging lens 101, it is necessary to use a lens with a high numeral aperture (NA). However, the lens with a high numeral aperture easily causes aberration, and its manufacturing cost is high, so it is not practical. On the other hand, in the compound eye optical system using a microlens array, a high-precision image can be obtained at low cost by performing image processing on the basis of a plurality of data obtained by the microlenses. Therefore, when a microlens array is used instead of the converging lens 101, the precision of the image data is improved.

Although the present invention is described referring to the embodiment, the invention is not limited to the embodiment, and can be variously modified.

For example, as information determining the rotation angle of the living organism 2, the positional information of the core of the fingerprint is described as an example; however, the invention is not limited to this, and as long as the two-dimensional information can determine the rotation angle, any other two-dimensional information may be used. Moreover, the case where the reference point is determined by the fixing cup 11 is described; however, the invention is not limited to this case, and the reference position of the core of each living organism 2 may be stored in the pattern storing section 15 in advance to be used for comparison.

Moreover, the case where the three-dimensional information of the vein pattern of the living organism 2 is formed on the basis of data produced by image pickup using a variable focusing microlens is described, but the invention is not limited to the case. For example, by a plurality of microlenses each having a different refractive power, image pickup data on a plurality of different layers of the living organism 2 may be obtained.

Further, in the above-described embodiment, the case where the surface S1 of the surfaces S1 and S2 of the electrodes 122 and 124 has a curved surface in the microlens array 12 is described; however, for example, the surface S2 may also have a curved surface, thereby microlenses having curved surfaces on both sides of the liquid crystal layer 123 may be formed.

Moreover, in the above-described embodiment, in the case where the microlenses are formed of liquid crystal microlenses is described; however, microlenses with any other configuration may be used, and, for example, liquid microlenses using two liquid layers of different kinds may be used.

Further, the light source 10 applies light from the image pickup device 13; however, not only in a system (a transmission system) in which the light source 10 is arranged on a side facing the image pickup device 13 with the living organism 2 in between, or the case where the light source 10 is arranged on the longitudinal side of a living organism, but also in the case where the light source 10 is arranged on the lateral side of a finger, a system of obtaining three-dimensional shape data shown in the invention is effective.

Moreover, the case where when a voltage supplied from the voltage supplying section 17 to the microlenses in the microlens array 12 is relatively large, the focal length is relatively short, and when the supplied voltage is relatively small, the focal length is relatively large is described; however, depending on the kind of a liquid crystal material forming the liquid crystal layer 123 of the microlens array 12, the biometric authentication system can have a configuration in which when the voltage is relatively large, the focal length can be relatively large, and when the voltage is relatively small, the focal length can be relatively short. Even in this case, the same effects as those in the above-described embodiment can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. A biometrics authentication system comprising:
   a light source configured to apply light to a living organism;
   a microlens array section configured to condense light received from the living organism, the microlens array section including a plurality of microlenses, each microlens of the plurality of microlenses having a different refractive power;
   an image pickup device configured to obtain image pickup data of the living organism based on light condensed by the microlens array section;
   a rotation angle determining section configured to determine a rotation angle of the living organism based on the image pickup data of the living organism;
   a three-dimensional information producing section configured to produce three-dimensional information of the living organism based on the image pickup data of the living organism; and
   an authentication section that performs authentication based on the rotation angle determined by the rotation angle determining section and the three-dimensional information produced by the three-dimensional information producing section.

2. The biometrics authentication system according to claim 1, wherein
   the rotation angle determining section is configured to determine the rotation angle of the living organism on the basis of image pickup data of a surface of the living organism.

3. The biometrics authentication system according to claim 2, wherein
   the rotation angle determining section is configured to determine the rotation angle of the living organism on the basis of a position of a core of a fingerprint.

4. The biometrics authentication system according to claim 3, wherein
   the three-dimensional information producing section is configured to produce three-dimensional information of a vein pattern of the living organism.

5. The biometrics authentication system according to claim 1, further comprising:
   a pattern storing section storing a three-dimensional authentication pattern of the living organism.

6. The biometrics authentication system according to claim 5, wherein
   the authentication section obtains a partial authentication pattern according to the rotation angle from the three-dimensional authentication pattern, and performs authentication by comparing the partial authentication pattern with the three-dimensional information.

7. The biometrics authentication system according to claim 1, further comprising:
   a voltage supplying section supplying a voltage to the plurality of microlenses.

8. The biometrics authentication system according to claim 7, wherein
   the microlenses change their refractive powers according to the voltage supplied from the voltage supplying section.

9. The biometrics authentication system according to claim 8, wherein the plurality of microlenses each include:
   a first substrate facing a second substrate;

a first electrode formed on the first substrate and a second electrode formed on the second substrate, the voltage from the voltage supplying section being applied to the first or second electrode; and a liquid crystal layer arranged between the pair of electrodes.

10. The biometrics authentication system according to claim 9, wherein a surface of the first electrode has a plurality of concave curved surfaces formed in a matrix for forming a first microlens surface in the liquid crystal layer.

11. The biometrics authentication system according to claim 10, wherein a surface of the second electrode has a plurality of concave curved surfaces formed in a matrix for forming a second microlens surface in the liquid crystal layer.

12. The biometrics authentication system according to claim 10, wherein a refractive index of the liquid crystal layer is configured to change based on the voltage supplied from the voltage supplying section.

* * * * *